United States Patent
Cheung et al.

(10) Patent No.: US 8,203,932 B2
(45) Date of Patent: Jun. 19, 2012

(54) METHOD AND SYSTEM FOR PROTECTION SWITCHING IN ETHERNET RING

(75) Inventors: Tae Sik Cheung, Daejeon (KR); Do Yeon Kim, Daejeon (KR); Byung Jun Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 402 days.

(21) Appl. No.: 12/626,360

(22) Filed: Nov. 25, 2009

(65) Prior Publication Data

US 2010/0135154 A1 Jun. 3, 2010

(30) Foreign Application Priority Data

Dec. 2, 2008 (KR) .......... 10-2008-0121251
Apr. 1, 2009 (KR) .......... 10-2009-0027976

(51) Int. Cl.
*H04L 12/26* (2006.01)
(52) U.S. Cl. .................................. 370/216
(58) Field of Classification Search .......... 370/216–224; 398/1–5, 17, 25
See application file for complete search history.

(56) References Cited

U.S. PATENT DOCUMENTS

| | | | |
|---|---|---|---|
| 7,099,922 B2 * | 8/2006 | Pospesel et al. | 709/208 |
| 7,545,735 B1 * | 6/2009 | Shabtay et al. | 370/217 |
| 7,558,205 B1 * | 7/2009 | Moncada-Elias et al. | 370/236 |
| 7,564,858 B1 * | 7/2009 | Moncada-Elias et al. | 370/402 |
| 7,639,944 B2 * | 12/2009 | Wang | 398/3 |
| 7,961,596 B2 * | 6/2011 | Maruyoshi et al. | 370/217 |
| 2005/0041601 A1 * | 2/2005 | Kam et al. | 370/258 |
| 2005/0243823 A1 | 11/2005 | Griswold et al. | |
| 2008/0192624 A1 * | 8/2008 | de Frias Rebelo Nunes | 370/223 |
| 2008/0232802 A1 | 9/2008 | Wang | |

FOREIGN PATENT DOCUMENTS

KR 2008-0039189 A 5/2008

\* cited by examiner

*Primary Examiner* — Dmitry H Levitan
(74) *Attorney, Agent, or Firm* — Rabin & Berdo, P.C.

(57) ABSTRACT

A method and system for protection switching in Ethernet rings are disclosed. The method for protection switching in Ethernet rings includes: receiving a server signal fail (SSF), an Ethernet lower layer fault signal, a remote defect indication (RDI) for informing a different port about a fault state when a uni-directional fault is generated, and ring-automatic protection switching (R-APS) information for requesting Ethernet ring protection switching; comparing the SSF, the RDI, and the R-APS information, and setting states of the first and second Ethernet rings; determining a protection switching priority level of each of the first and second Ethernet rings according to the states of the first and second Ethernet rings; and performing protection switching on the first and second Ethernet rings according to their protection switching priority levels.

17 Claims, 6 Drawing Sheets

METHOD AND SYSTEM FOR PROTECTION SWITCHING IN ETHERNET RING

CROSS-REFERENCE TO RELATED APPLICATIONS

This application claims the priorities of Korean Patent Application No. 10-2008-0121251 filed on Dec. 2, 2008 and Korean Patent Application No. 10-2009-0027976 filed on Apr. 1, 2009, in the Korean Intellectual Property Office, the disclosures of which are incorporated herein by reference.

BACKGROUND OF THE INVENTION

1. Field of the Invention

The present invention relates to a method and system for protection switching in an Ethernet ring and, more particularly, to a method and system for supplementing and improving a protection switching method in an interconnected Ethernet ring defined in ITU-T recommendation G.8032 Version 2.

2. Description of the Related Art

ITU-T recommendation G.8032 designates one of a plurality of links constituting an Ethernet ring as a ring protection link (RPL) and a node connected to one of both ports of the RPL as an RPL owner, so that the RPL owner can usually block the RPL to prevent a loop generation. Thereafter, if a fault occurs in links other than the RPL or from a node, the RPL owner may release the block state of the RPL and initialize a filtering database (FDB) of each node to allow service traffic to be transferred via a new path (route) formed through MAC address learning.

Since the stipulation of the ITU-T recommendation G.8032 Version 1, version 2 has been in the course of development since October 2008. While G.8032 Version 1 only defines protection switching within a single Ethernet ring, G.8032 Version 2 includes a protection switching regulation for a case where two or more Ethernet rings are interconnected.

Ethernet rings are interconnected by a shared node or a shared link. In the case of Ethernet rings interconnected by the shared node, when a fault occurs in the shared node, both Ethernet rings are isolated. Thus, interconnected Ethernet rings are generally configured by using the shared link to establish a reliable network.

FIG. 1 illustrates Ethernet rings interconnected by a shared link.

With reference to FIG. 1(a), one of certain links (referred to as 'local links', hereinafter), excluding shared links, may be designated as an RPL of each of first and second Ethernet rings. In the first Ethernet ring, a link a-j is designated as an RPL and a node 'a' is designated as an RPL owner, and in the second Ethernet ring, a link e-f is designated as an RPL and a node 'e' is designated as an RPL owner. Active topologies illustrated in FIG. 1 represent logical connections between nodes.

When a fault occurs in a local link, a pertinent Ethernet ring performs protection switching. With reference to FIG. 1(b), as a fault occurs in a link a-b, a local link, of the first Ethernet ring, the RPL of the first Ethernet ring is released to allow for a location connection among nodes in a new active topology.

However, if a fault occurs in a shared link and both Ethernet rings perform protection switching, the RPLs of the first and second Ethernet rings would both be released to form a super-loop as shown in FIG. 1(c), causing the entire network to be irresponsive due to broadcast storming.

Thus, in order to avoid this problem, the ITU-T recommendation G.8032 Version 2 currently under discussion stipulates that only a previously designated Ethernet ring perform protection switching when a fault occurs in the shared link. FIG. 1(d) shows the case where the first Ethernet ring is set by a manager to preferentially perform protection switching over the second Ethernet ring in the occurrence of a fault in the shared link, which does not form a loop unlike the case as shown in FIG. 1(c).

However, this method has a problem in that if another fault occurs in local links other than the shared link, the connections between the nodes of the Ethernet rings are cut off. As shown in FIG. 1(e), if a fault occurs in a local link and at the shared link of the first Ethernet ring which has been set to have a higher priority level, only the first Ethernet ring performs protection switching, resulting in a case in which the Ethernet ring is divided into nodes b-c-d-e and nodes f-g-h-i-j-a.

In addition, G.8032 only defines a recovery method for single fault as generated in Ethernet rings. However, if faults are generated from two places in a state wherein the two Ethernet rings are interconnected as shown in FIG. 1(e), although, in fact, each Ethernet ring has a single fault based on an arithmetic calculation, the current G.8032 cannot guarantee perfect connectivity between the nodes.

SUMMARY OF THE INVENTION

An aspect of the present invention provides a method and system for protection switching in Ethernet rings capable of actively selecting a proper Ethernet ring according to a state of each Ethernet ring to thus establish a reliable, interconnected Ethernet ring network.

According to an aspect of the present invention, there is provided a system for protection switching in Ethernet rings, including: a first Ethernet ring protection controller configured to output state information of a first Ethernet ring including first and second port management units and perform a protection switching function according to a protection switching priority level of an Ethernet ring; a second Ethernet ring protection controller configured to output state information of a second Ethernet ring including second and third port management units and perform a protection switching function according to a protection switching priority level of an Ethernet ring; and an Ethernet ring priority level determining unit configured to receive the state information of each Ethernet ring from the first and second Ethernet ring protection controllers, determine a protection switching priority level of each Ethernet ring according to the state information of each Ethernet ring, and transmit the determined protection switching priority level of each Ethernet ring to the first and second Ethernet ring protection controller.

According to another aspect of the present invention, there is provided a method for protection switching in Ethernet rings in a system including first and second Ethernet ring protection controllers including local ports respectively connected to local links of first and second Ethernet rings and shared ports respectively connected to shared links of the first and second Ethernet rings, including: receiving a server signal fail (SSF), an Ethernet lower layer fault signal, a remote defect indication (RDI) for informing a different port about a fault state when a uni-directional fault is generated, and ring-automatic protection switching (R-APS) information for requesting Ethernet ring protection switching; comparing the SSF, the RDI, and the R-APS information, and setting states of the first and second Ethernet rings; determining a protection switching priority level of each of the first and second Ethernet rings according to the states of the first and second Ethernet rings; and performing protection switching on the first and second Ethernet rings according to their protection switching priority levels.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
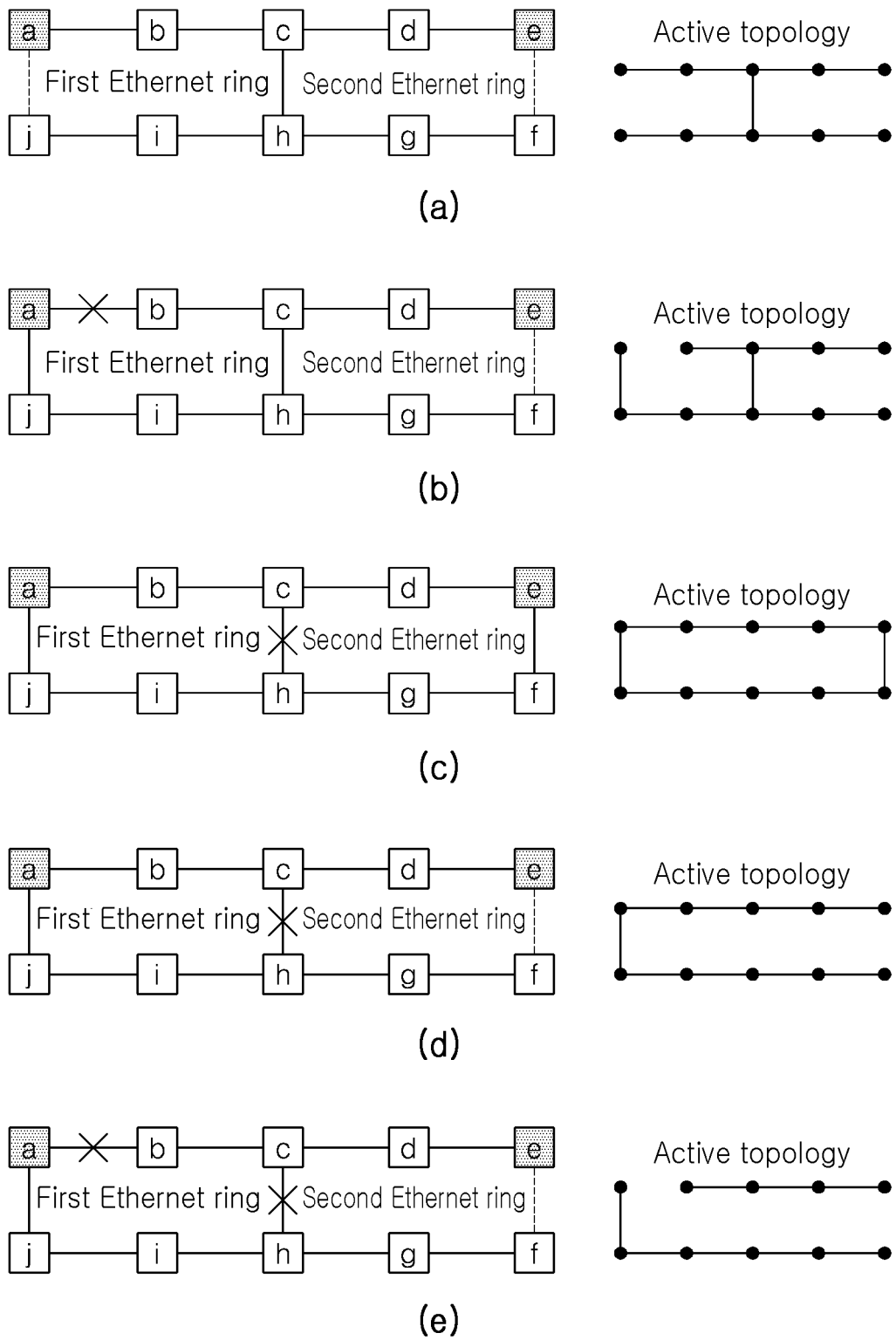
FIG. 1 illustrates Ethernet rings interconnected by shared links.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

In an exemplary embodiment of the present invention, two interconnected Ethernet rings will be taken as an example for the sake of brevity. When N number of Ethernet rings are shared by a single shared link, (N+1) number of port management units and N number of Ethernet ring protection (ERP) controllers may be extendedly provided. A forwarding unit interworks with the (N+1) number of port management units, and an Ethernet ring priority level determining unit is extended to give a higher protection switching priority level to one of the N number of Ethernet rings upon receiving state information of the Ethernet rings from the N number of ERP controllers.

Exemplary Embodiment

Figure 2:
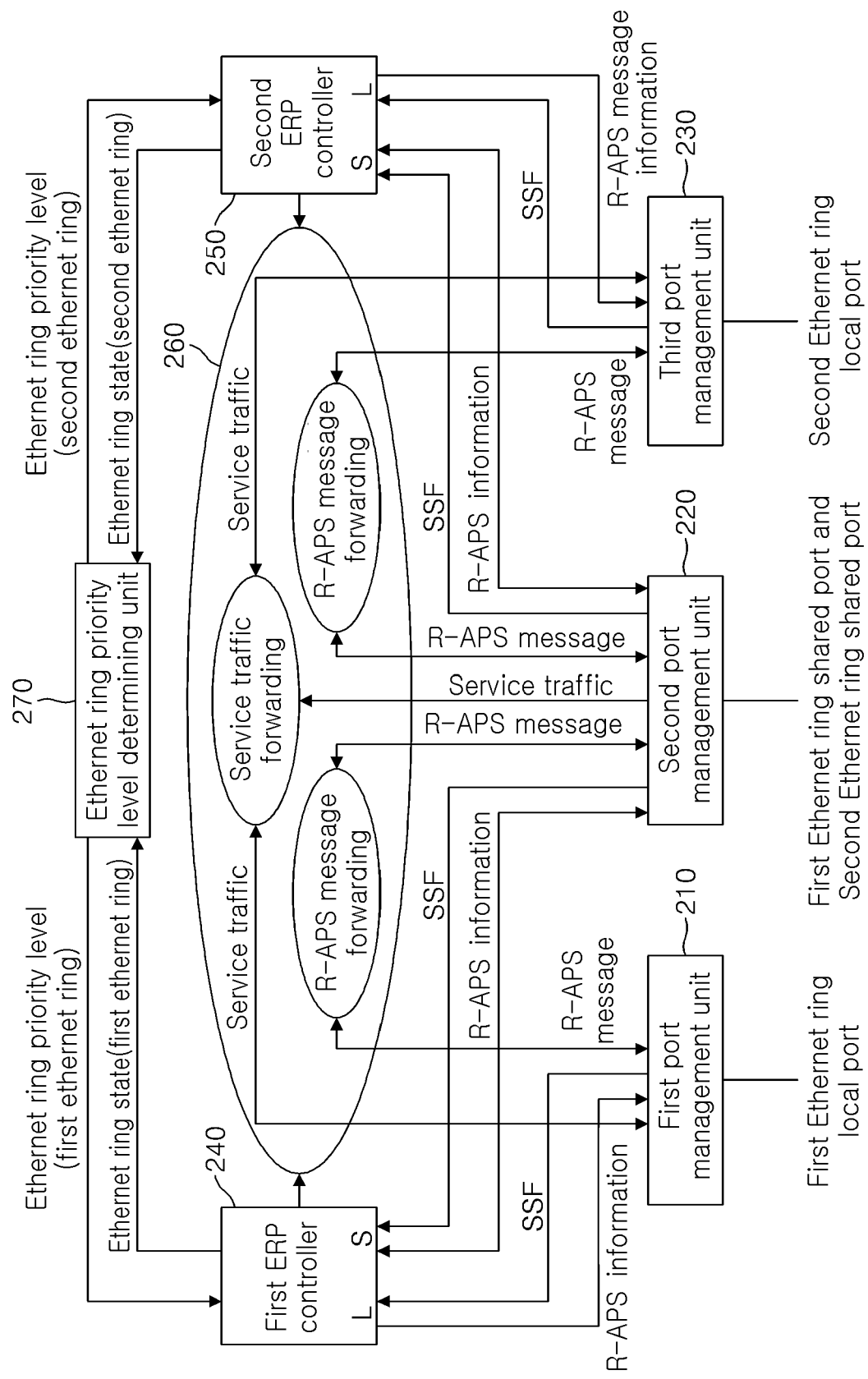
FIG. 2 illustrates the configuration of an Ethernet ring protection switching system according to an exemplary embodiment of the present invention.

FIG. 2 illustrates the configuration of an Ethernet ring protection switching system according to an exemplary embodiment of the present invention.

With reference to FIG. 2, an Ethernet ring protection switching system according to an exemplary embodiment of the present invention includes a first port management unit 210, a second port management unit 220, a third port management unit 230, a first ERP controller 240, a second ERP controller 250, a forwarding unit 260, an Ethernet ring priority level determining unit 270, and the like.

The first, second, and third port management units 210, 220, and 230 process Ethernet service traffic, ring-automatic protection switching (R-APS) message, and an operation, administration and maintenance (OAM) message, etc., received from an Ethernet port according to a method defined in the conventional standard such as IEEE standard 802.1Q-2007, ITU-T recommendation G.8032 Version 2, and the like.

The first ERP controller 240 performs a protection switching function and a ring state management function defined in G.8032 Version 2 for a first Ethernet ring including the first and second port management units 210 and 220.

The second ERP controller 250 performs the protection switching function and a ring state management function defined in G.8032 Version 2 for a second Ethernet ring including the second and third port management units 220 and 230.

The forwarding unit 260 transfers the service traffic, the R-APS message, and the OAM message, etc., input from or output to the first, second, and third port management units 210, 220, and 230 according to the method defined in the conventional standard such as IEEE standard 802.1Q-2007, ITU-T recommendation G.8032 Version 2, and the like.

The Ethernet ring priority level determining unit 270 receives state information (R_Stat) regarding each Ethernet ring from the first and second ERP controllers 240 and 250, determines a protection switching priority level indicating the protection switching order of each Ethernet ring, and transfers the determined protection switching priority levels to the first and second ERP controllers 240 and 250, whereby if an error (i.e., a fault, a failure, etc.) occurs in a shared link, protection switching can be performed only in one Ethernet ring according to the priority levels determined based on the state of the individual Ethernet rings.

The first port management unit 210 connected to the first ERP controller 240 is connected to a local link of the first Ethernet ring. The third port management unit 230 connected to the second ERP controller 250 is connected to a local link of the second Ethernet ring. The second port management unit 220 is connected to a shared link shared by the first and second Ethernet rings. The first and second ERP controllers 240 and 250 are each connected to the local links and the shared link of the respective Ethernet rings via local ports (L) and shared ports (S).

The first, second, and third port management units 210, 220, and 230 and the forwarding unit 260 operate according to the stipulation of the conventional IEEE standard 802.1Q-2007, ITU-T recommendation G.8032 Version 2, and ITU-T recommendation Y.1731. Namely, the first, second, and third port management units 210, 220, and 230 classify an Ethernet frame received from a physical layer into service traffic, an R-APS message, and an OAM message, and output the same to the forwarding unit 260, and at the same time, they output R-APS information extracted from the R-APS message and state information (SSF) extracted from a lower Ethernet layer to the first and second ERP controllers 240 and 250. Conversely, the first, second, and third port management units 210, 220, and 230 convert service traffic, an R-APS message, and an OAM message received from the forwarding unit 260 into an Ethernet frame and output the converted Ethernet frame to the physical layer. Also, the first, second and third port management units 210, 220, and 230 receive the R-APS information from the first and second ERP controllers 240 and 250, generate an R-APS message, and output the same to the physical layer.

Figure 3:
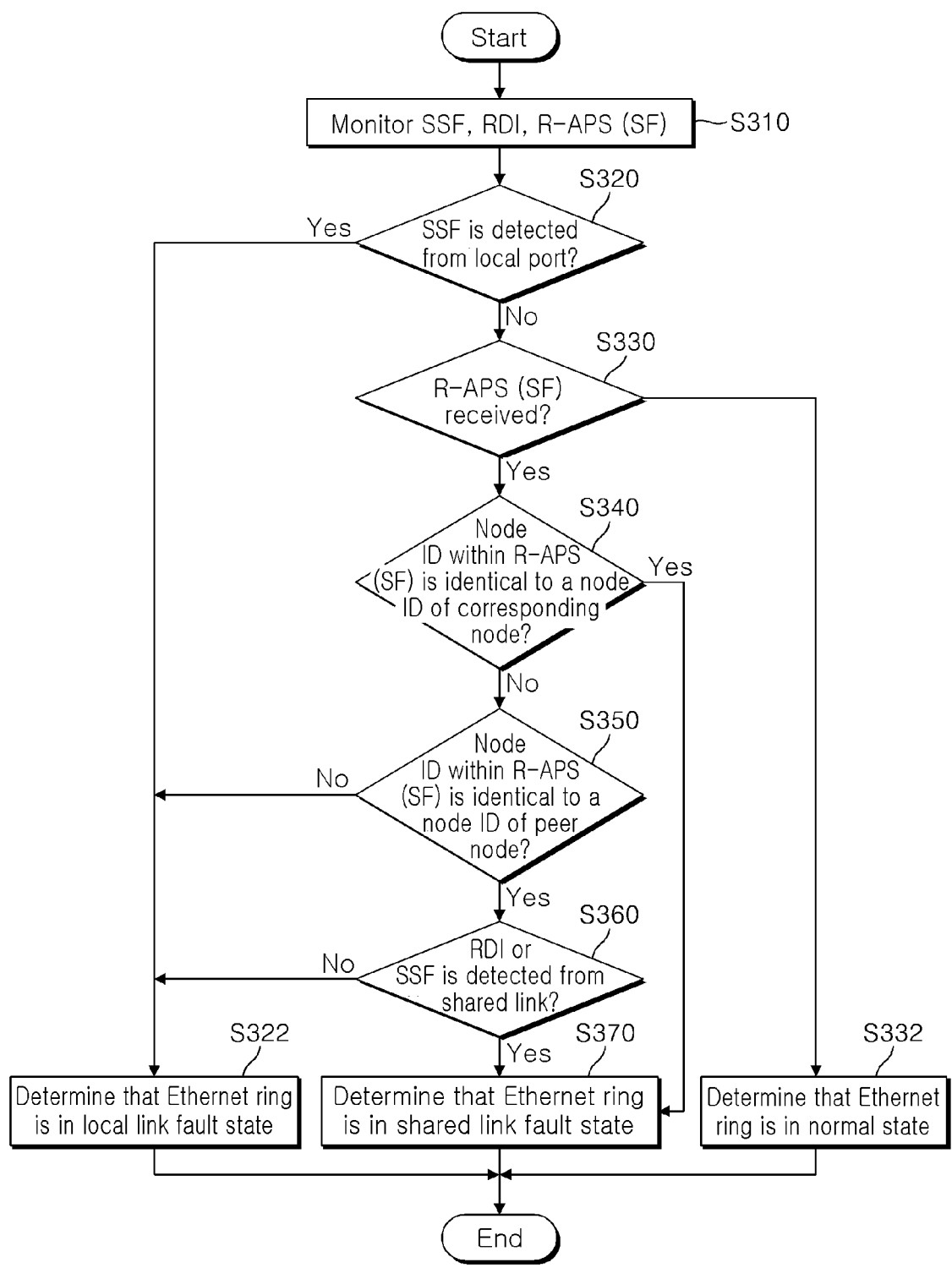
FIG. 3 is a flow chart illustrating the process of a method for determining a state of an Ethernet ring according to an exemplary embodiment of the present invention.

The first and second ERP controllers 240 and 250 perform an operation such as that shown in FIG. 3 besides an Ethernet ring protection switching protocol defined in the conventional ITU-T recommendation G.8032 Version 2.

FIG. 3 is a flow chart illustrating the process of a method for determining a state of an Ethernet ring according to an exemplary embodiment of the present invention.

Two nodes connected to a shared link have information about their own node ID so that, through a node ID of a received R-APS message, they can determine whether or not it has been generated by a local ring node (a node in their own network) or by a peer node (a node from an outside ring) connected via the shared link.

With reference to FIG. 3, local ports and a shared port monitor server signal fail (SSF), a remote defect indication (RDI), and ring-automatic protection switching (R-APS) (S310). Here, the SSF refers to an Ethernet lower layer fault signal input from the port management units 210 and 230 connected to the local ports of the ERP controllers 240 and 250, or an Ethernet lower layer fault signal input from the port management unit 220 connected to the shared ports of the ERP controllers 240 and 250. The RDI is a signal for informing a different port about a fault state in the occurrence of a uni-directional fault that a fault is detected from one of both ports connected to a link, which is defined as a field in a continuity check message (CCM) message, one of OAM messages, in the ITU-T recommendation Y.1731.

Whether or not SSF is detected from a local port is determined (S320). If SSF is detected from a local port, a state of the corresponding Ethernet ring is determined to be a local link fail state (Local_link_Fail) (S322).

If no SSF is detected from a local port in step S320, whether or not R-APS information has been received is determined (S330). If R-APS information has not been received, the state of the corresponding Ethernet ring as a normal state (i.e., idle) (S332). If SSF is detected from a peer node connected to the shared link, the peer node transmits R-APS information to the shared port. Thus, SSF is detected from the shared port when SSF is detected from local port.

When the R-APS is received in step S330, the corresponding node determines whether or not a node ID in the R-APS information is identical to its node ID (S340). If the node ID in the R-APS information is identical to the node ID of the corresponding node, it means that SSF has been generated in the shard link, so the state of the Ethernet ring is determined to be a shared link fault state (Shared_Link_Fail) (S370).

If the node ID in the R-APS information is not identical to the node ID of the corresponding node in step S340, the corresponding node determines whether or not the node ID in the R-APS information is identical to a node ID of the peer node (S350). If the node ID of the R-APS information is not identical to the node ID of the peer node, the state of the Ethernet ring is determined to be a local link fault state (S322). Namely, because the received R-APS information has been generated from a different node, not from the corresponding node nor from the peer node, it is determined that a local link has a fault and the state of the Ethernet ring is determined to be a local link fault state (S322).

If the node ID in the R-APS is identical to the node ID of the peer node in step S350, whether or not the shared link has a fault is determined by detecting RDI or SSF from the shared link (S360). If no fault is detected from the shared link, the R-APS information is a message output by the peer node which has detected a fault in a local link, so the state of the Ethernet ring is determined to be a local link fault state (S322).

If a fault is detected in the shared link in step S360, the R-APS information is a message output by the peer node which has detected a fault in the shared link, so the state of the Ethernet ring is determined to be a shared link fault state (S370).

Meanwhile, a node c and a node h connected by a shared link in FIG. 1 include the ERP controller according to the exemplary embodiment of the present invention, but the other remaining nodes may well operate only with the existing protection switching function. In this respect, however, if the other remaining nodes do not support the RDI defined in the ITU-T recommendation Y.1731 and a uni-directional fault is generated from the local port of the peer node and, at the same time, a fault is generated from the shared port, then a problem arises in that, the state of the Ethernet ring is determined to be a shared link fault state as in step S360 of FIG. 3, which must be determined to be a local link fault state, though.

Figure 4:
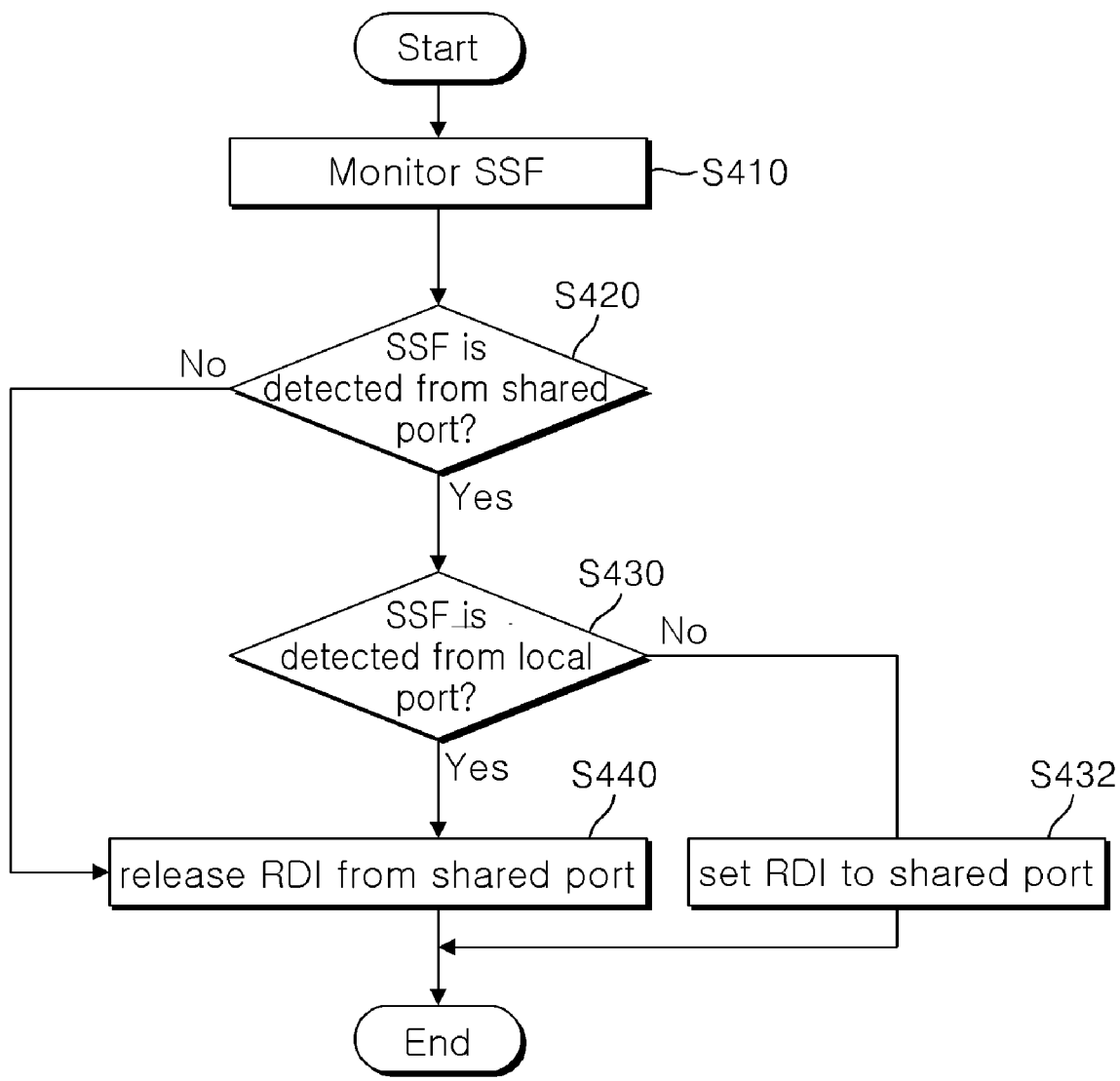
FIG. 4 is a flow chart illustrating the process of a method for setting and releasing an RDI in a shared port according to an exemplary embodiment of the present invention.

Thus, in order to avoid such a problem, the RDI is set and released at the shared port as shown in FIG. 4. Here, the RDI refers to an RDI field in the CCM message output via the shared port. This is an example of a case following the signal defined in the conventional ITU-T recommendation Y.1731, and besides, the RDI information may be transferred by using reserved bits in the R-APS message, or may be transferred by a control message.

With reference to FIG. 4, SSF is monitored in the local port and the shared port (S410).

Whether or not SSF is detected from the shared port is determined (S420), and if SSF is not detected from the shared port, RDI in the shared port is released (S440).

If SSF is detected from the shared port (S420), it is determined whether or not SSF is detected from the local port (S430). If SSF is not detected from the local port, RDI is set to the shared port (S432).

If SSF is detected from the local port (S430), the RDI in the shared port is released (S440).

Figure 5:
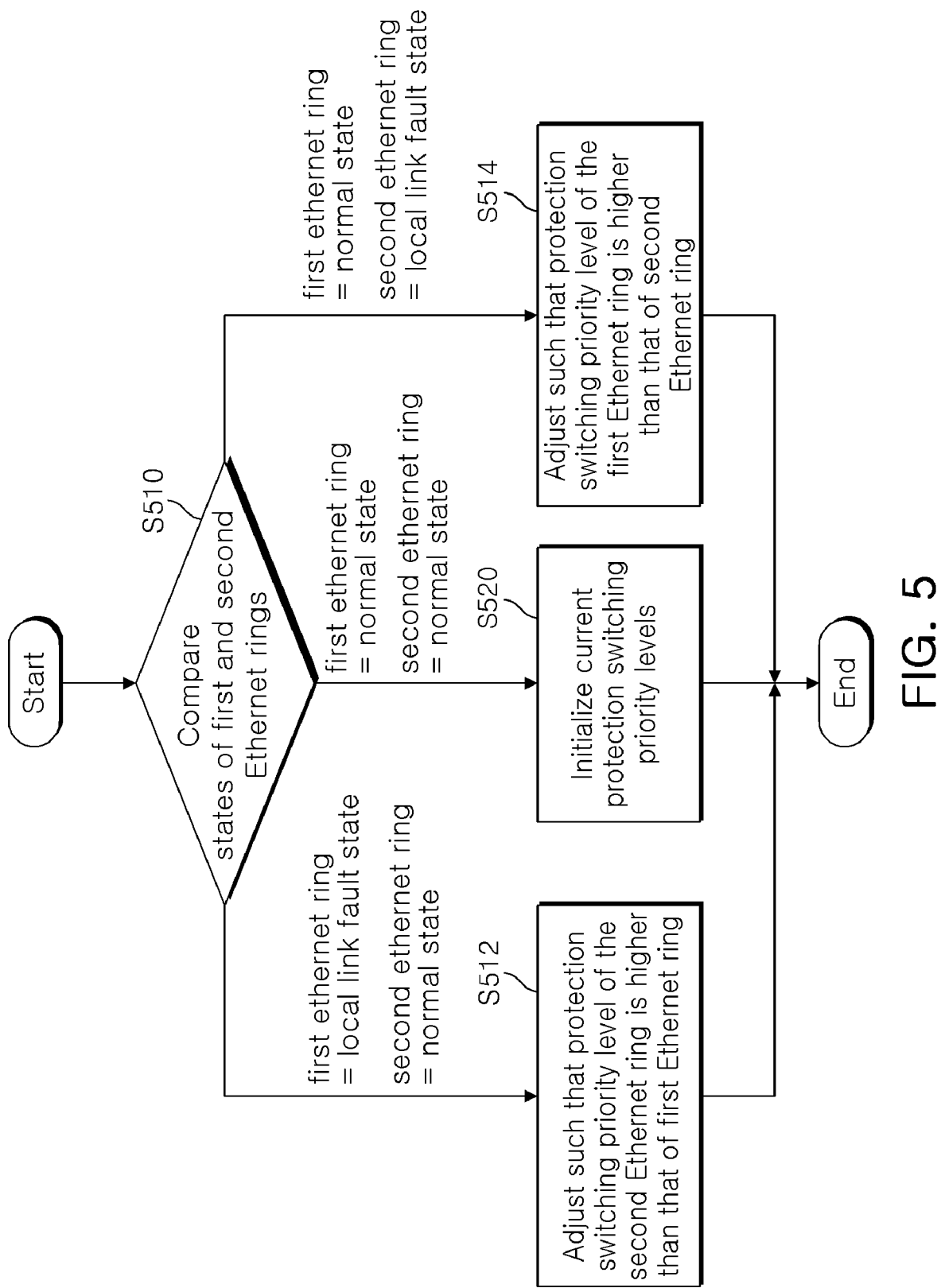
FIG. 5 is a flow chart illustrating the process of a method for determining protection switching priority levels of Ethernet rings according to the state of the Ethernet rings according to an exemplary embodiment of the present invention.

FIG. 5 is a flow chart illustrating the process of a method for determining protection switching priority levels for Ethernet rings according to the state of the Ethernet rings according to an exemplary embodiment of the present invention.

First, initial protection switching priority levels of the first and second Ethernet rings are designated as high and low levels, respectively. Thus, in the occurrence of a shared link fault, protection switching is preferentially performed on the first Ethernet ring.

With reference to FIG. 5, the states of the first and second Ethernet rings are compared (S510).

If the first Ethernet ring is in a local link fault state while the second Ethernet ring is in a normal state, the protection switching priority level of the second Ethernet ring is adjusted to be higher than the first Ethernet ring (S512). Here, if the second Ethernet ring is not in a local link fault state, it may be in a shared link fault state or in a normal state. In this case, however, because the second Ethernet ring has a lower protection switching priority level than the first Ethernet ring, if the shared link fault state of the second Ethernet ring occurs, it does not affect the second Ethernet ring, so the shared link fault state of the second Ethernet ring is regarded to be the same as the normal state.

Accordingly, because the protection switching has been performed due to the local link fault of the first Ethernet ring, the second Ethernet ring has the higher protection switching priority level, and if a shared link fault occurs afterwards, protection switching is performed on the second Ethernet ring.

If both the first and second Ethernet rings are in the normal state, current protection switching priority levels are initialized (S520). In this case, if the protection switching priority levels are rendered to be operated in a non-revertive mode, the step S520 may be omitted.

If the second Ethernet ring is in a local link fault state while the first Ethernet ring is in a normal state, the protection switching priority level of the first Ethernet ring is adjusted to be higher than that of the second Ethernet ring (S514).

Figure 6:
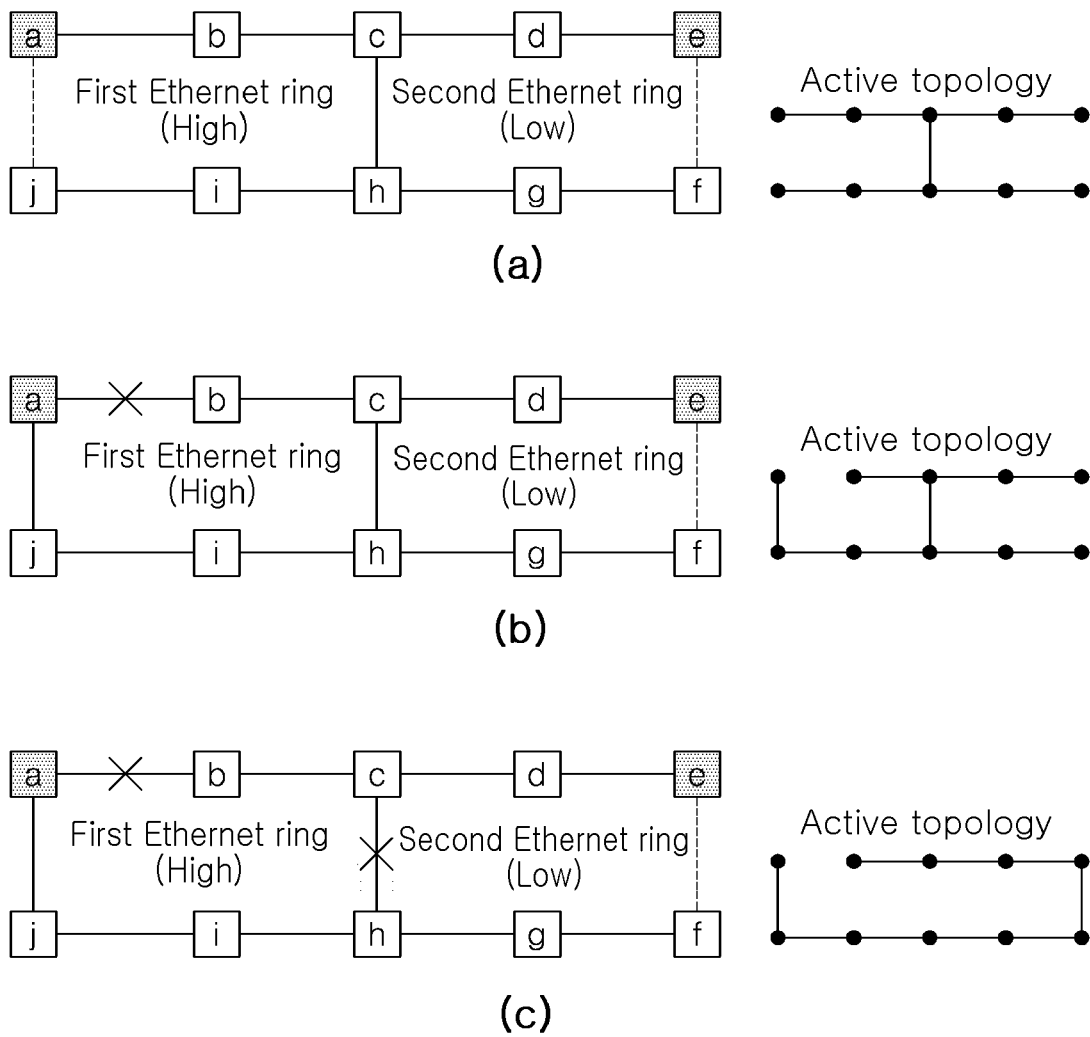
FIG. 6 is illustrates a protection switching operation of Ethernet rings according to an exemplary embodiment of the present invention.

FIG. 6 illustrates a protection switching operation of the Ethernet rings according to an exemplary embodiment of the present invention.

With reference to FIG. 6(a), in an initial state, the first Ethernet ring has a higher protection switching priority level than that of the second Ethernet ring.

With reference to FIG. 6(b), when a fault is generated in a local link of the first Ethernet ring, the first Ethernet ring performs protection switching to unblock an RPL of the first Ethernet ring. In this time, the first Ethernet ring is in the local link fault state and the second Ethernet ring is in the normal state, so the protection switching priority level of the second Ethernet ring is adjusted to be higher than the first Ethernet ring.

With reference to FIG. 6(c), when a fault is additionally generated in the shared link, the second Ethernet ring performs protection switching according to the protection switching priority levels of the Ethernet rings to unblock an RPL of the second Ethernet ring. In this manner, the Ethernet ring protection switching method according to an exemplary embodiment of the present invention can guarantee the connectivity of the nodes in spite of the faults generated in the shared link and in one local link. In addition, the Ethernet ring protection switching method according to an exemplary embodiment of the present invention can also guarantee connectivity of nodes in various combinations including one local link fault and shared link fault.

As set forth above, in the method and system for protection switching in Ethernet ring according to exemplary embodiments of the invention, the protection switching priority levels of the respective Ethernet rings are determined according to their states and protection switching is performed on the respective Ethernet rings. Thus, when a shared link and a single local link is faulty in an interconnected Ethernet ring network, a state of perfect connectivity between nodes, which is not supported by the existing G.8032 Version 2, can be provided.

In addition, because the protection switching priority levels of the respective Ethernet rings are actively controlled in the interconnected Ethernet ring network, a network manager does not need to manually designate a protection switching priority level according to states of the Ethernet rings.

While the present invention has been shown and described in connection with the exemplary embodiments, it will be apparent to those skilled in the art that modifications and variations can be made without departing from the spirit and scope of the invention as defined by the appended claims.

What is claimed is:

1. A system for protection switching in Ethernet rings, the system comprising:
    a first Ethernet ring protection controller configured to output state information of a first Ethernet ring including first and second port management units and perform a protection switching function according to a protection switching priority level of an Ethernet ring;
    a second Ethernet ring protection controller configured to output state information of a second Ethernet ring including second and third port management units and perform a protection switching function according to a protection switching priority level of an Ethernet ring; and
    an Ethernet ring priority level determining unit configured to receive the state information of each Ethernet ring from the first and second Ethernet ring protection controllers, determine a protection switching priority level of each Ethernet ring according to the state information of each Ethernet ring, and transmit the determined protection switching priority level of each Ethernet ring to the first and second Ethernet ring protection controller.

2. The system of claim 1, wherein the state information of each Ethernet ring is one of a local link fault state, a shared link fault state, and a normal state.

3. The system of claim 2, wherein if the first Ethernet ring is in the local link fault state and the second Ethernet ring is in the normal state, the Ethernet ring priority level determining unit adjusts the second Ethernet ring to have a higher protection switching priority level than that of the first Ethernet ring, if the first Ethernet ring is in normal state and the second Ethernet ring is also in the normal state, the Ethernet ring priority level determining unit initializes the current protection switching priority levels of the Ethernet rings, and if the first Ethernet ring is in the normal state and the second Ethernet ring is in the local link fault state, the Ethernet ring priority level determining unit adjusts the first Ethernet ring to have a higher protection switching priority level than that of the second Ethernet ring.

4. A method for protection switching in Ethernet rings in a system including first and second Ethernet ring protection controllers including local ports respectively connected to local links of first and second Ethernet rings and shared ports respectively connected to shared links of the first and second Ethernet rings, the method comprising:
    receiving a server signal fail (SSF), an Ethernet lower layer fault signal, a remote defect indication (RDI) for informing a different port about a fault state when a uni-directional fault is generated, and ring-automatic protection switching (R-APS) information for requesting Ethernet ring protection switching;
    comparing the SSF, the RDI, and the R-APS information, and setting states of the first and second Ethernet rings;
    determining a protection switching priority level of each of the first and second Ethernet rings according to the states of the first and second Ethernet rings; and
    performing protection switching on the first and second Ethernet rings according to their protection switching priority levels.

5. The method of claim 4, wherein the setting of the states of the first and second Ethernet rings comprises:
    determining whether or not SSF is detected from the local ports;
    if SSF is not detected from the local port, determining whether or not the R-APS information has been received;
    if the R-APS information has been received, determining whether or not a node ID within the R-APS information is identical to a node ID of one end of the shared link;
    if the node ID within the R-APS information is not identical to the node ID of one end of the shared link, determining whether or not the node ID within the R-APS information is identical to a node ID of another end of the shared link;
    if the node ID within the R-APS information is identical to the node ID of the other end of the shared link, determining whether or not the local link supports RDI;

if the local link supports the RDI, determining whether or not RDI or SSF is detected from the shared link; and if RDI or SSF is detected from the shared link, determining that the first and second Ethernet rings are in a shared link fault state.

6. The method of claim 5, wherein the setting of the states of the first and second Ethernet rings further comprises:

when SSF is detected from the local port, determining that the first and second Ethernet rings are in a local link fault state.

7. The method of claim 5, wherein the setting of the states of the first and second Ethernet rings further comprises:

if the R-APS information has not been received, determining that the first and second Ethernet rings are in a normal state.

8. The method of claim 5, wherein the setting of the states of the first and second Ethernet rings further comprises:

if the node ID within the R-APS information is identical to the node ID of one end of the shared link, determining that the first and second Ethernet rings are in a shared link fault state.

9. The method of claim 5, wherein the setting of the states of the first and second Ethernet rings further comprises:

if the node ID within the R-APS information is not identical to the node ID of the other end of the shared link, determining that the first and second Ethernet rings are in a local link fault state.

10. The method of claim 5, wherein the setting of the states of the first and second Ethernet rings further comprises:

if RDI or SSF is not detected from the shared link, determining that the first and second Ethernet rings are in a local link fault state.

11. The method of claim 5, further comprising:

if RDI is not supported at the local link, setting or releasing RDI to or from the shared port according to whether or not SSF is detected from the local port and the shared port.

12. The method of claim 11, wherein the setting or releasing of the RDI to or from the shared port comprises:

monitoring SSF at the local port and the shared port;

determining whether or not SSF is detected from the shared port;

if SSF is detected from the shared port, determining whether or not SSF is detected from the local port; and if SSF is detected from the local port, releasing the RDI from the shared port.

13. The method of claim 12, wherein the setting or releasing of the RDI to or from the shared port further comprises:

if SSF is not detected from the shared port, releasing the RDI from the shared port.

14. The method of claim 12, wherein the setting or releasing of the RDI to or from the shared port further comprises:

if SSF is not detected from the local port, setting the RDI to the shared port.

15. The method of claim 4, wherein the determining of the protection switching priority levels of the Ethernet rings comprises:

comparing the states of the first and second Ethernet rings; and if the first Ethernet ring is in a local link fault state while the second Ethernet ring is in a normal state, raising the protection switching priority level of the second Ethernet ring so as to be higher than that of the first Ethernet ring.

16. The method of claim 15, wherein the determining of the protection switching priority levels of the Ethernet rings further comprises:

if the first and second Ethernet rings are in a normal state, initializing the current protection switching priority levels of the Ethernet rings.

17. The method of claim 15, wherein the determining of the protection switching priority levels of the Ethernet rings further comprises:

if the first Ethernet ring is in the normal state while the second Ethernet ring is in a local link fault state, raising the protection switching priority level of the first Ethernet ring so as to be higher than that of the second Ethernet ring.

* * * * *